United States Patent [19]

Evans

[11] 4,116,157
[45] Sep. 26, 1978

[54] ROTATABLE VISUAL INDICATOR FOR SAFETY SYSTEMS

[75] Inventor: Willie V. Evans, Kilgore, Tex.

[73] Assignee: ACF Industries, Incorporated, New York, N.Y.

[21] Appl. No.: 741,648

[22] Filed: Nov. 15, 1976

[51] Int. Cl.$^2$ ............ F16K 37/00; G01L 19/12
[52] U.S. Cl. ................. 116/125; 116/114 PV; 137/557
[58] Field of Search .......... 116/125, 114 PV, 114 AJ, 116/114 AE; 73/406, 419; 137/557, 553

[56] References Cited

U.S. PATENT DOCUMENTS

| | | | |
|---|---|---|---|
| 1,126,146 | 1/1915 | Werner | 73/419 |
| 1,611,659 | 12/1926 | Malivert | 116/114 PV X |
| 3,247,824 | 4/1966 | Rodgers | 116/114 PV |
| 3,523,451 | 8/1970 | Kohn | 73/406 X |
| 3,556,043 | 1/1971 | Vayda | 116/114 PV |
| 3,921,665 | 11/1975 | Lebzelter | 137/557 X |
| 3,975,959 | 8/1976 | Larkin | 73/419 |

Primary Examiner—Daniel M. Yasich
Attorney, Agent, or Firm—Eugene N. Riddle

[57] ABSTRACT

A visual indicating device having an elongated slide valve mounted for longitudinal movement in a central bore of a housing. One end of the slide valve has a piston thereon mounted in a piston chamber and is responsive to a sensed fluid pressure in a flow line. The visual indicator is adjacent the other end of the slide valve and includes an outer fixed indicator element and an inner axially aligned rotatable indicator element. The outer fixed indicator element has a plurality of pie-shaped segments with alternate segments being transparent to permit visual viewing of the movable inner indicator element. The inner indicator element has a plurality of pie-shaped segments with alternate segments being of a green color and intervening segments being of a red or contrasting color. The altenate segments of the inner indicator element are axially aligned with the transparent segments of the outer indicator element in one position to present visually one color and the intervening segments are axially aligned with the transparent segments in the otherposition to present visually the contrasting color.

4 Claims, 5 Drawing Figures

ROTATABLE VISUAL INDICATOR FOR SAFETY SYSTEMS

BACKGROUND OF THE INVENTION

Heretofore, visual indicator devices have been provided to indicate visually an abnormal operating condition. Such devices have normally included a plunger movable between extended and retracted positions with one color being presented visually where the plunger is extended and a contrasting color being presented visually when the plunger is retracted. At times, particularly where substantial distances are involved, it is sometimes difficult to view clearly the color being presented.

DESCRIPTION OF THE INVENTION

The present invention is directed to a visual indicating device having an elongated slide valve mounted in a central bore of a housing for longitudinal movement between extended and retracted positions. One end of the slide valve has a piston thereon mounted in an enlarged end bore portion urged in one direction by a spring and in the opposite direction by fluid pressure. The visual indicator is adjacent the other end of the slide valve and includes an outer fixed indicator and an inner axially aligned rotatable indicator element. The outer fixed indicator element has a plurality of pie-shaped segments with alternate segments being transparent to permit visual viewing of the inner indicator element. The inner indicator element has a plurality of pie-shaped segments with alternate segments being of a green color and intervening segments being of a red contrasting color. The alternate green segments of the inner indicator element are axially aligned with the transparent segments on the fixed indicator element in one position to present the green color to a viewer to indicate a normal operation condition and the intervening segments are axially aligned with the transparent segments in the other position to present the red contrasting color to a viewer to indicate a predetermined abnormal operation condition.

The inner rotatable element forms a circular indicator dial divided into alternate green and intervening red pie-shaped segments each comprising a thirty degree arc. The pie-shaped transparent segments of the fixed indicator element are of the same size and register in an axial direction with the pie-shaped segments on the inner rotatable dial. When the green segments on the movable dial are in axial alignment with the transparent segments a strong and dominant green color is presented. When the red segments on the movable dial are in axial alignment with the transparent segments on the fixed indicator elements, the red color is dominant and the indicator presents a red hue to indicate an abnormal operation condition. The slide valve is operatively connected to the rotatable indicator element and effects rotation of the indicator element as it moves between extended and retracted positions.

Figure 1:
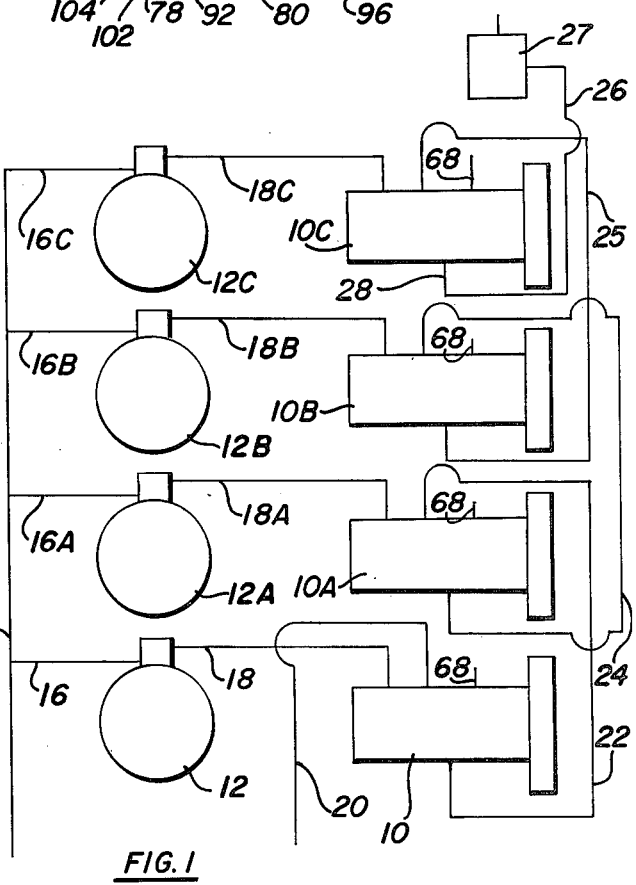
FIG. 1 is a schematic of a fluid system in which the visual indicator comprising the present invention is utilized.

Referring to the drawings for a better understanding of this invention and more particularly to FIG. 1, a plurality of identical indicator devices indicated generally at 10, 10A, 10B, and 10C are arranged in a series relation. Each indicator device 10, 10A, 10B, and 10C is arranged to monitor a respective associated pilot valve 12, 12A, 12B, and 12C. Pilot valves 12, 12A, 12B, and 12C are of the type which are actuated upon reaching of a predetermined high pressure or a predetermined low pressure in a production flowline (not shown) which is being monitored by the pilot valves. Upon the actuation of one of the pilot valves, the associated production flowline for the respective pilot valve is shut-in by the closing of a valve in the flowline. For further details of the operation of pilot valves 12, 12A, 12B, and 12C reference is made to U.S. Pat. No. 3,043,331 issued July 10, 1962, Fluid pressure is supplied to pilot valves 12, 12A, 12B, and 12C through a fluid line 14 and branch lines 16, 16A, 16B, and 16C. Lines 18, 18A, 18B, and 18C supply fluid pressure to respective indicating devices 10, 10A, 10B, and 10C to maintain the indicating devices in a retracted normal operating position which indicates a normal operating condition for the flowlines monitored or sensed by pilot valves 12, 12A, 12B, and 12C. Upon the actuation of a pilot valve 12, 12A, 12B, and 12C resulting from a predetermined abnormal operating condition in the flowline being monitored by the respective pilot valve, fluid is bled from the associated fluid line between the pilot valve and the association visual indicator device to permit the associated indicator device to move to an extended position to indicate an abnormal condition.

A separate fluid line 20 supplies fluid to indicator device 10 and in series through line 22 to indicator device 10A, then through line 24 to indicator device 10B, then through line 25 to indicator device 10C, and from indicator device 10C through fluid line 26 to a panel indicator 27. Panel indicator 27 may be at a location remote from the location of indicator devices 10, 10A, 10B, and 10C and will indicate if any of the indicator devices have been actuated to indicate an abnormal condition.

Each indicator device 10, 10A, 10B, and 10C is identical and for purposes of illustration only indicator device 10 is shown in detail in FIGS. 2-5. Referring to FIGS. 2-5, indicator device 10 has an elongated housing or body 30 with a central bore 32 therethrough. Central bore 32 includes an enlarged diameter end portion 34 at one end of body 30 and an enlarged diameter end portion 36 at the other end of body 30. The small diameter portion of bore 32 is indicated at 38 and an intermediate diameter bore portion 40 is formed between small diameter portion 38 and enlarged end portion 34.

Figure 2:
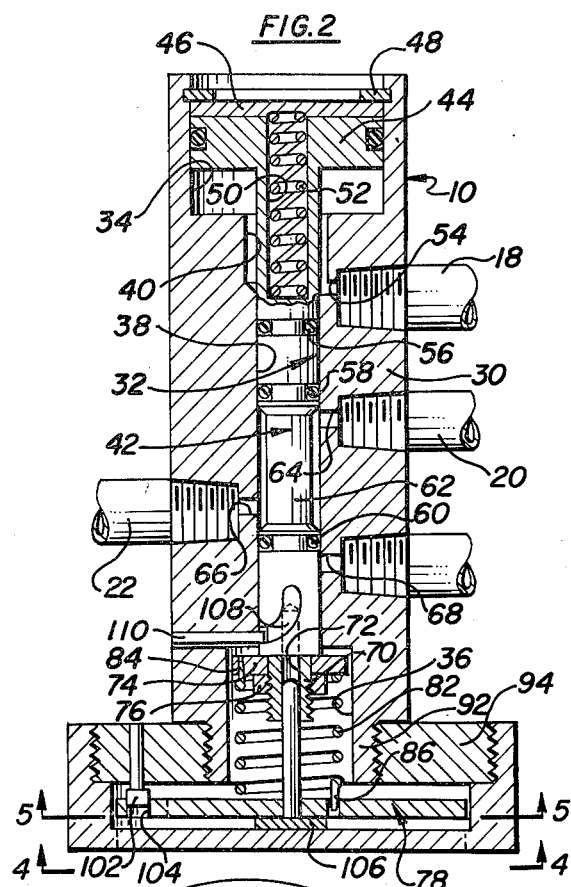
FIG. 2 is a sectional view of the visual indicator shown in FIG. 1 in which a slide valve is in a retracted position with the movable indicator element indicating a normal operating position.
Figure 3:
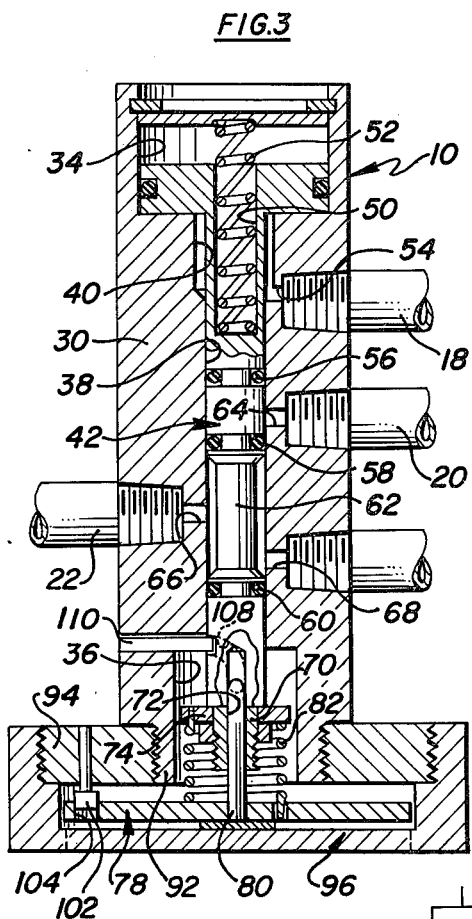
FIG. 3 is a sectional view similar to FIG. 2 but showing the slide valve in an extended position with the movable indicator element indicating a predetermined abnormal operating condition.
Figure 5:
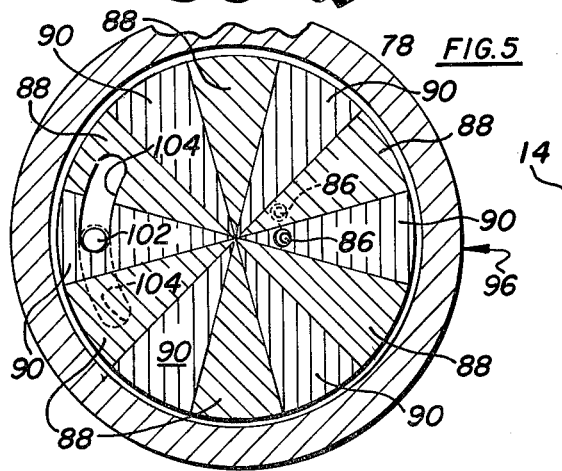
FIG. 5 is a section taken generally along line 5—5 of FIG. 2 and showing the movable inner indicator element with alternate green segments and intervening red segments.

Mounted for movement between extended and retracted positions within bore 32 is an elongated slide valve generally indicated at 42. The slide valve 42 has a piston 44 secured to one end thereof mounted for movement within enlarged end bore portion 34 which forms a piston chamber. An end plate 46 defines one end of the piston chamber formed by enlarged bore end portion 34 and a split ring 48 retains plate 46 in position. Slide valve 42 has a longitudinally extending end opening 50 in which a spring 52 is received between plate 48 and slide valve 42 to urge continuously slide valve 42 to the extended position thereof shown in FIG. 3. Line 18 is connected to a first inlet opening 54 which is in fluid communication with intermediate diameter bore portion 40. Thus, line 18 supplies fluid pressure to the piston chamber to hold piston 44 in its retracted position as shown in FIG. 2 against the bias of spring 52. Slide valve 42 has O-rings 56, 58 and 60 positioned in annular grooves about the periphery of slide valve 42 in sealing contact with the adjacent wall defining bore 32. Slide valve 42 has a reduced diameter intermediate section 62 formed between O-rings 58 and 60. Fluid line 20 is connected to a second inlet opening 64 in fluid communication with bore 32 and, as shown in FIG. 2, line 20 is in fluid communication with line 22 connected to outlet opening 66 when reduced diameter slide valve section 62 is in the position of FIG. 2. A vent or bleed opening 68 is in fluid communication with bore 32 and as shown in FIG. 2, O-ring 60 blocks fluid pressure from vent 68. However, in the extended position of slide valve 42 shown in FIG. 3, line 22 is vented to atmosphere through vent opening 68 and line 20 is blocked between seals formed by O-rings 56 and 58. Slide valve 42 has a threaded reduced diameter end 70 and a central opening 72 is provided in the end of slide valve 42. A spring retainer 74 is fitted over the reduced diameter end 70 and a nut 76 threaded onto threaded end 70 holds spring retainer 74 in position. A movable indicator element generally indicated at 78 comprises a flat rotatable dial having a stem 80 secured thereto adjacent one end and having its other end received with opening 72 for sliding and rotative movement. A torsion spring 82 has one end 84 secured to spring retainer 74 and has its other opposite end 86 secured to rotatable indicator element 78. As shown in FIG. 5, inner rotatable indicator element 78 has a plurality of alternate pie-shaped segments 88 of a green color each comprising around a thirty degree arc. Intervening segments 90 are of the same size as segments 88 but are of a red color each comprising around a thirty degree arc.

Figure 4:
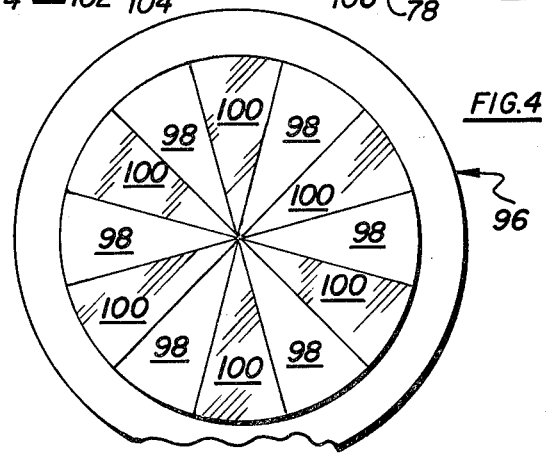
FIG. 4 is a plan view of the indicating end of the visual indicator showing the fixed outer indicator element with the transparent segments and looking generally along line 4—4 of FIG. 2.

Housing 30 has a reduced diameter threaded end 92 and an internally threaded ring 94 is threaded onto end 92. Ring 94 has external screw threads thereon and a fixed outer indicator element generally indicated at 96 and being generally cup-shaped in cross-section is threaded onto ring 94 to form a cover for the end of housing 30. As shown in FIG. 4, fixed indicator element 96 has a flat outer surface including a plurality of pie-shaped alternate segments 98 which are white in color. Positioned between each pair of segments 98 is an intervening segment 100 which is transparent. Fixed indicator element 96 may preferably be formed of a clear plastic material with intervening segments 98 being painted white with the remainder of indicator element 96 being transparent and clear.

Secured to ring 94 is a stop 102 which is received within an arcuate groove 104 in indicator element 78. Arcuate groove 104 has an arc of thirty degrees and limits the movement of indicator element 78 to a total rotational movement of thirty degrees. A spacer 106 is positioned between inner indicator element 78 and outer fixed indicator element 96.

To rotate indicator element 78 for a 30° arc, a cam groove 108 is formed about the outer periphery of slide valve 42. A pin 110 has an extending end fitting within cam groove 108. Pin 110 is fixed to housing 30 and upon a downward movement of slide valve 42 the upper edge defining groove 108 rides along the end of pin 110 to rotate slide valve 42 about its longitudinal axis. Slide valve 42 rotates around ninety degrees about its longitudinal axis to move spring 82 past a neutral position for moving indicator element 78. Upon movement of slide valve 42 from the position of FIG. 2 to the position of FIG. 3, dial or indicator element 78 rotates in a counter clockwise direction as viewed in FIGS. 4 and 5. In the position of FIG. 2, red segments 90 are in axial alignment with and covered by white segments 98 in fixed indicator element 96, and green segments 88 are in alignment with transparent segments 100. Therefore, in the position of FIG. 2, a green color is presented to a viewer of the end of indicator device 10. In the extended position shown in FIG. 3, movable element 78 has rotated thirty degrees and stop 102 engages the other opposite end of slot 104. In this position, red segments 90 are in axial alignment with transparent segments 100 with green segments 88 being covered by white segments 98 and a red color is presented by indicator device. Upon a return movement of slide valve 42 from the extended position shown in FIG. 3 to the retracted position of FIG. 2, pin 102 rides along the lower edge defining cam groove 108 and movable element 78 is returned to the position shown in FIGS. 2 and 5. Slide valve 42 rotates around 90° in the opposite direction when slide valve 42 returns to the retracted position shown in FIG. 2 to move spring 82 past a neutral or substantially dead center position thereby to urge movable element 78 to its return position in FIG. 5. While segments 100 are illustrated as being transparent, it is to be understood that other arrangements might be provided to view rotatable element 78 such as having segments 100 cut out.

In operation, referring to FIG. 1, fluid pressure is supplied through lines 18, 18A, 18B, and 18C to respective indicator devices 10, 10A, 10B, and 10C to hold indicator devices in the retracted position shown in FIG. 2 by fluid pressure acting against piston 44. In this position, the green color is visually recognizable and a normal operating position or condition is indicated by the indicator devices. Fluid pressure is supplied by line 20 to indicator device 10 and in series through lines 22, 24, 25 and 26 to indicator devices 10A, 10B, 10C and panel indicator 27. Thus, in normal operating position all indicator devices 10, 10A, 10B, and 10C are in the position indicated in FIG. 2. Panel indicator 27 is located at a remote location and is held in a normal position by fluid pressure in line 26.

In the event pilot valve 12 monitoring a flowline condition senses an excessively high fluid pressure, for example, pilot valve 12 will be actuated and will bleed line 18 to atmosphere. Upon the bleeding of line 18 to atmosphere, spring 52 moves piston 44 and slide valve 42 to the position of FIG. 3. In this position, lines 22, 24, 25, and 26 will be bled to atmosphere through vent 68. Lines 18A, 18B, and 18C hold associated indicator devices 10A, 10B, and 10C in the retracted position. Panel indicator 27 upon the bleeding of line 26 is actuated and indicates that at least one of the indicator devices is in abnormal extended position. A workman should then check the indicator devices.

When the abnormal condition is corrected, the associated pilot valve is repressurized and the indicator device therefor is returned to a retracted position. This permits fluid pressure from line 10 to again be supplied to panel indicator 27 which effects resetting of indicator 27.

In the event pilot valve 12B monitors an excessively high pressure condition in the associated flowline, for example, line 18B will be bled and the associated indicator element 10B will be moved to an extended position. In this instance, line 24 is blocked and lines 25 and 26 are bled to atmosphere through associated vent 68. Panel indicator 27 thus would again be actuated to indicate a problem.

What is claimed is:

1. A visual indicator structure for indicating a predetermined fluid pressure condition in a fluid system comprising:

a housing having a central bore therein, an elongate slide valve mounted within said bore for longitudinal movement between extended and retracted positions and having a piston adjacent one end thereof in fluid communication with a sensed fluid in the system, said slide valve being biased to extended position by spring means;

visual indicating means mounted adjacent the other end of the slide valve within the bore for movement between a first indicating position to indicate normal operation and a second indicating position to indicate a predetermined abnormal operating condition in the fluid system being sensed, said visual indicating means including an outer fixed indicator element and a generally flat movable inner indicator element, means mounting the inner indicator element for rotational movement about an axis generally in alignment with the longitudinal axis of the slide valve;

said outer indicator element having a plurality of pie-shaped clear segments, said inner indicator element being divided into alternate pie-shaped segments of one color and into intervening pie-shaped segments of another contrasting color, said alternate and intervening segments being alternately aligned with the clear segments of the outer indicator element for viewing;

a torsion spring having one end secured to the inner indicator element and the other end secured to the slide valve, and means to effect rotation of the slide valve about its longitudinal axis as it moves longitudinally between extended and retracted positions including a cam groove in the slide valve and a pin received in said groove and fixed to said housing to effect rotation of said slide valve upon longitudinal movement thereof, said slide valve rotating in one direction when moving to an extended position for biasing said torsion spring in one direction and rotating in an opposite direction when moving in an opposite direction for biasing said torsion spring in an opposite direction.

2. A visual indicator structure in fluid communication with a pilot valve for indicating a predetermined fluid pressure condition in a fluid system being sensed by the pilot valve and comprising:

a housing having a central bore therein, an elongate slide valve mounted within said bore for longitudinal movement between extended and retracted positions and having a piston adjacent one end thereof mounted within an enlarged bore portion to form a piston chamber, a spring continuously urging the slide valve in one direction to an extended position, fluid pressure means in fluid communication with said piston and responsive to the pilot valve to retain the slide valve in a retracted position against the bias of said spring above a predetermined minimum fluid pressure, said slide valve moving to an extended position under the bias of said spring when a predetermined minimum fluid pressure is reached upon actuation of the associated pilot valve and venting of the piston chamber;

visual indicated means mounted adjacent the other end of the slide valve within the bore for movement between a first indicating position in the retracted position of the slide valve to indicate normal operation and a second indicating position in the extended position of the slide valve to indicate a predetermined abnormal operating condition in the fluid system being sensed, said visual indicating means including on outer fixed indicator element and a generally flat movable inner indicator element, the inner indicator element being mounted by means connected to said slide valve and said inner indicator element for rotational movement relative to said fixed indicator element about an axis generally in alignment with the longitudinal axis of the slide valve;

said outer indicator element having at least one transparent portion thereof, said inner indicator element having contrasting colors movable into and out of axial alignment with said outer transparent portion for visual presentation to a viewer, and cam means having cooperating elements operatively connected between the housing and said slide valve and responsive to the movement of the slide valve between extended and retracted positions for rotation of the inner indicator element between said first and second indicating positions relative to the fixed indicator element.

3. A visual indicator structure as set forth in claim 2, wherein said outer indicator element has a plurality of pie-shaped clear segments, and said inner indicator element is divided into alternate pie-shaped segments of one color and into intervening pie-shaped segments of another contrasting color, said alternate and intervening segments being alternately aligned with the clear segments of the outer indicator element for viewing.

4. A visual indicator as set forth in claim 2 wherein said cam means comprises a cam groove in the slide valve and a pin received in said groove and fixed to said housing to effect rotation of said slide valve upon longitudinal movement thereof.

* * * * *